US008239221B2

(12) United States Patent
Harkensee et al.

(10) Patent No.: US 8,239,221 B2
(45) Date of Patent: *Aug. 7, 2012

(54) METHODS FOR SELLING INSURANCE USING RAPID DECISION TERM

(75) Inventors: James Harkensee, Arlington Heights, IL (US); Richard A. Hemmings, Glenview, IL (US)

(73) Assignee: Fidelity Life Association, Oak Brook, IL (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/013,962

(22) Filed: Jan. 14, 2008

(65) Prior Publication Data

US 2009/0182584 A1 Jul. 16, 2009

(51) Int. Cl.
*G06Q 40/00* (2006.01)
(52) U.S. Cl. .............................................. 705/4; 705/41
(58) Field of Classification Search .................. 705/4
See application file for complete search history.

(56) References Cited

U.S. PATENT DOCUMENTS

| 7,370,000 | B2 * | 5/2008 | Sherman | 705/4 |
| 7,756,790 | B2 * | 7/2010 | Buerger | 705/41 |
| 7,797,174 | B2 * | 9/2010 | Samuels | 705/4 |
| 2002/0165740 | A1 * | 11/2002 | Saunders | 705/4 |
| 2003/0074233 | A1 * | 4/2003 | Lee | 705/4 |
| 2003/0208385 | A1 * | 11/2003 | Zander et al. | 705/4 |
| 2004/0181435 | A9 * | 9/2004 | Snell et al. | 705/4 |
| 2004/0236612 | A1 * | 11/2004 | Heusinkveld et al. | 705/4 |
| 2007/0021987 | A1 * | 1/2007 | Binns et al. | 705/4 |
| 2007/0094053 | A1 * | 4/2007 | Samuels | 705/4 |
| 2008/0082370 | A1 * | 4/2008 | Collins et al. | 705/4 |

FOREIGN PATENT DOCUMENTS

EP 1351177 * 8/2003

OTHER PUBLICATIONS

Mass Mutual rewards wellness in new whole life product. Best's Review / Life-Health Insurance Edition; May 94, vol. 95 Issue 1, p. 80.*
"Life Underwriting Requirements Guide", ING North America Insurance Corporation, Jan. 2009.

* cited by examiner

*Primary Examiner* — Robert Niquette
(74) *Attorney, Agent, or Firm* — K&L Gates LLP

(57) ABSTRACT

An insurer sells a life insurance policy having a coverage period equal in length to the term of the policy. The consideration paid by the insured is relatively high compared to conditional receipt coverage, but is generally lower than that charged for standard simplified issue policies. The policy is only underwritten on a limited basis, preferably using information available in remote databases. During a predetermined time period, the insured has the option of providing medical test results or other material sufficient to enable comprehensive medical underwriting. Upon receipt of the information and material, an underwriter comprehensively underwrites the policy. If the results of the underwriting are satisfactory, the premiums are reduced significantly for the remainder of the term of the insurance policy and/or the benefit amount is increased. If the insured does not provide any additional information or materials, or if the materials provided result in unsatisfactory underwriting, the premiums remain unchanged.

20 Claims, 2 Drawing Sheets

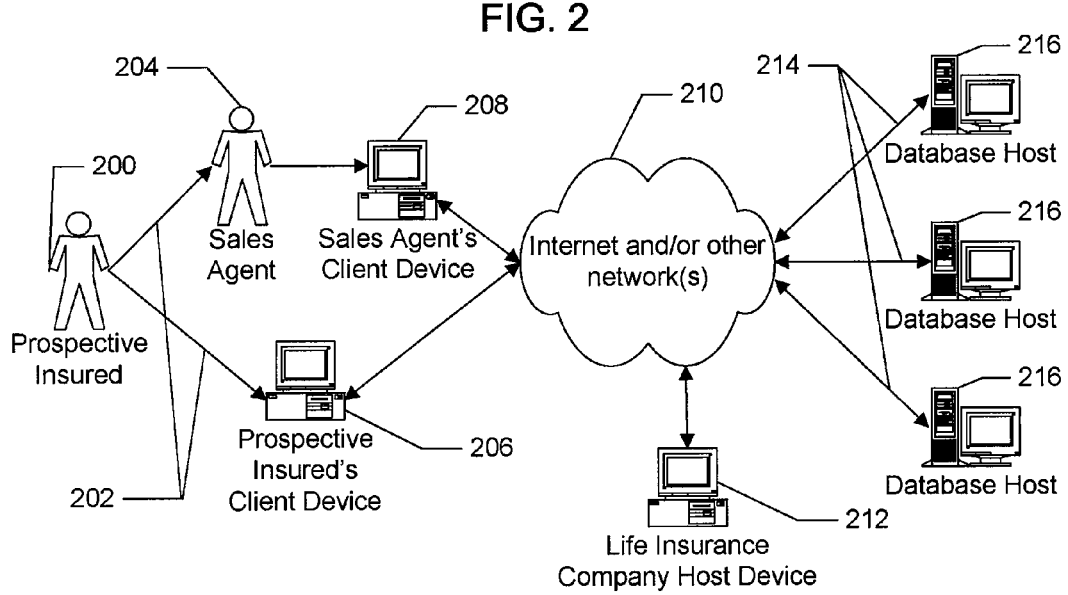
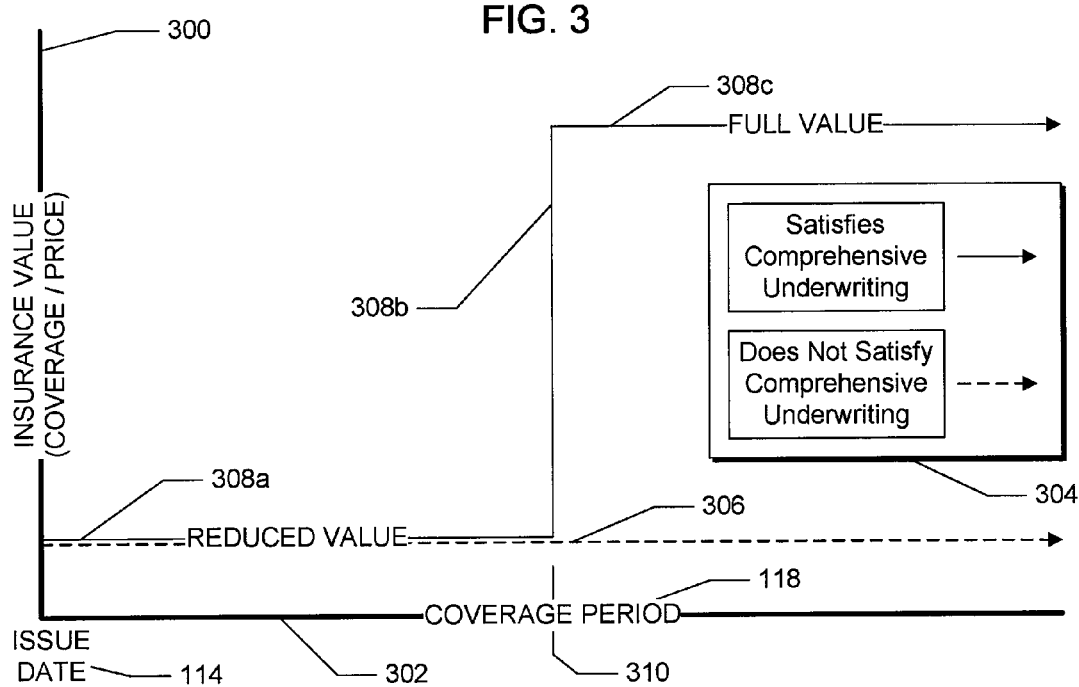

METHODS FOR SELLING INSURANCE USING RAPID DECISION TERM

TECHNICAL FIELD

The present disclosure relates in general to life insurance, and in particular to methods for selling life insurance, such that full coverage begins before a policy is comprehensively underwritten.

BACKGROUND

When a person purchases a life insurance policy from an insurance company, the insurance company agrees to provide a benefit to one or more designated beneficiaries upon the occurrence of an insured event. The insurance company and the policy owner enter into a contract, whereby the insurance company agrees to pay a sum of money (the benefit) upon the insured's death (the insured event). In exchange, the policy owner agrees to pay fees at regular intervals (the premiums) in amounts determined based on the insurance company's classification of the individual within its risk classification system. A life insurance policy is typically purchased by or on behalf of an individual to be insured, and upon purchasing the policy the purchaser designates one or more individuals or entities (the beneficiaries) to receive the benefit under the policy if and when an insured event occurs. Typically, the policy owner begins paying premiums coincident to commencement of coverage under the policy.

Sellers of life insurance policies face countervailing concerns when determining who to insure, how much to charge for coverage and the amount of coverage to provide. On one hand, offering customers large benefits at low premiums is a major selling point, and maximizes the number of insurance policies sold. On the other hand, insurance companies expose themselves to a great deal of risk with each insurance policy sold. As an example, if an insurance company sells a policy with a benefit amount of $500,000.00 and monthly premiums of $1,000.00, more than 40 years will elapse before the sum of the premiums received by the insurance company exceeds the benefit amount. If an insured event occurs early in the policy's term (e.g., the insured dies), for instance in the first five years, the insurance company is contractually obligated to distribute a large sum of money after having received only a small sum from premium payments. Insurance companies can mitigate this risk somewhat by increasing premiums, but doing so severely deters potential purchasers of insurance policies.

As a result of the risk inherent in selling life insurance policies, the goal of any life insurance company is to accurately predict the mortality rates of classes of individuals. Life insurance companies define classes based on risk factors, predict mortality rates for each class, and attempt to accurately classify prospective insureds based upon factors believed to be related to life expectancy. To ensure accurate classification of each prospective insured, each policy is underwritten based on predetermined risk factors such as age, sex, family medical history, the medical history and current health of the individual, motor vehicle records (MVRs), and other pertinent information. Accurate underwriting requires accurate assessment of risk factors, accurate classification of prospective insureds, and, assuming accurate prediction of mortality rates, enables successful mitigation and spreading of risk.

Life insurance policies are generally underwritten on either a limited or a comprehensive basis. Limited underwriting typically involves asking the prospective insured a series of questions about his or her medical history and perhaps searching various remote databases to determine information about the prospective insured, such as age, domicile, prescription medication taken, and criminal and driving history. Comprehensive underwriting typically involves analyzing the results of a series of medical tests and review of attending physician records to verify the answers to a series of questions about the health history of the prospective insured. The prospective insured is usually required to provide blood, urine, or other tissue samples to be tested by a laboratory or other medical professional, and the results are submitted to an underwriter. Based on the results of the medical tests and the prospective insured's answers to the questions, the insurance company classifies the risk associated with the prospective insured by placing them in predefined classes. The insurer then sets the premiums and benefit amount according to the mortality rates associated with the appropriate classes.

Requiring prospective insureds to undergo extensive medical testing before receiving insurance coverage is a major deterrent to the potential sale of an insurance contract. Besides being deterred by the physical invasiveness inherent in the comprehensive underwriting procedure, prospective insureds often hope to obtain coverage for the fall desired amount immediately upon applying for an insurance contract, and always hope to pay a reasonable rate for coverage. Life insurance companies, on the other hand, hope to sell as many policies as possible but also hope to manage risk by not providing coverage without reasonably thorough underwriting, a process that usually takes weeks or even months to complete.

In response to these concerns, methods of selling insurance involving a range of less than comprehensive underwriting have evolved. This range is defined by striking different balances between the invasiveness of the underwriting and the price paid for initial coverage. Generally, a consumer is provided some amount of coverage immediately upon acceptance by the insurance company of application and payment of a first premium. Both the amount of coverage and the premiums vary, however, based on whether the insured is covered by a simplified issue policy or some form of temporary insurance.

Some insurance companies issue so-called "simplified issue" insurance policies, typically in response to applications with just five or six questions about the health of the prospective insured. A simplified issue policy provides coverage following the insured's representations in the application and payment of the first premium, with coverage beginning upon the insurer's acceptance of the application for insurance. Simplified issue policies are initially underwritten on a limited basis by asking the prospective insured a short series of questions about the medical history and current health of the prospective insured. However, such policies still represent a great deal of risk to an insurer because there is little opportunity to verify the prospective insured's responses to the questions or determine health conditions or other pertinent risk information beyond the few questions answered by the applicant. To mitigate this risk, insurers typically charge relatively high premiums for simplified issue coverage and may void the coverage if false answers were provided and death occurs during the policy's contestable period (usually two years).

Insurance companies also sell products providing limited duration life insurance coverage. This limited duration coverage provides coverage for only a limited time, and typically provides coverage after the insured risk has been underwritten on only a limited basis. Agreements defining such limited coverage typically include limitations on the period of coverage, the face amount available to a beneficiary, and/or the conditions imposed by the insurer.

One common example of limited duration insurance coverage is coverage provided by agreements known as temporary insurance agreements. When it sells a temporary insurance agreement, an insurer usually agrees to provide insurance coverage for a specified, limited period of time. Typically, this period of time begins to run on the date on which the insurer receives the application and accepts the initial premium. When the specified, limited period of time expires, the insurer is typically no longer under any obligation to provide coverage of an insured's life under the temporary insurance agreement. Because of the risk inherent in insuring minimally underwritten risks, temporary insurance agreements typically are relatively expensive, provide relatively small benefit amounts, and provide coverage for a relatively short period of time.

Another common example of limited duration insurance coverage is a type of coverage known as conditional receipt coverage. When an applicant receives conditional receipt coverage, the insurance company provides the applicant with a premium receipt which makes the insurance effective only if or when specified conditions are met (e.g. the proposed insured's medical history is as was represented on the application, such that the insurance company issues the policy as applied for). Conditional receipt coverage may be viewed as a subset of limited duration life insurance coverage because along with the premium receipt, the insurance company may provide a benefit in the event of death of the prospective insured before the policy is issued only if the insured's health at the time of death is determined to have been as represented on the application such that the company would have issued coverage as applied for, in accordance with its normal underwriting guidelines. Conditional receipt coverage does not guarantee fill coverage until the insured has submitted results of a full battery of medical tests sufficient to enable comprehensive underwriting. Instead, the prospective insured receives conditional coverage between the time the offer of insurance is submitted and the time the underwriter is satisfied by the comprehensive underwriting and the applicant is accepted. Consideration paid for conditional receipt coverage is typically low—during the coverage period before satisfactory comprehensive underwriting, the low premiums reflect the limited coverage. During the period after comprehensive underwriting, the low premiums reflect a coverage amount equal to the insured's full desired coverage amount provided only after satisfactory completion of comprehensive medical underwriting. Because the comprehensive underwriting assures the insurer of the health of the prospective insured, more accurate classification is possible and the insurer can charge lower premiums due to the relatively lesser risk presented by the fully underwritten policy. Satisfaction of the requisite comprehensive medical underwriting, however, requires action on the part of the insured. The insured must submit to an extensive medical examination administered by a qualified physician, a paramedical examiner, or an approved laboratory, and often must submit blood, urine, or other tissue for analysis by a laboratory or other medical professional.

There are downsides to the above methods of selling life insurance. Simplified issue insurance, while providing immediate and unconditional coverage, is very expensive to maintain and therefore is not a viable option to many consumers. Temporary insurance agreements, while typically easier to obtain due to the lack of comprehensive medical underwriting, are limited in duration and typically do not satisfy an insured's long-term life insurance needs. Additionally, temporary insurance agreements may be relatively expensive and may provide relatively lower benefit amounts. Conditional receipt coverage, while more affordable, requires that individuals submit to a much more rigorous medical testing regimen before complete coverage is provided. If the medical testing is not performed soon after applying for the policy, the policy will not be issued and any temporary coverage will lapse after a short period. Because many potential insureds fail to obtain the required tests in a timely fashion, many who apply for policies never become insured as planned. Even among those who do submit to the required testing, the results of the medical tests may result in the discovery of risk factors that cause the insurer to classify prospective insureds such that premiums are so high as to be unaffordable, or result in the insurer making counter offers for higher premiums or lesser amounts of insurance.

SUMMARY

In the method described herein, an insurer sells a life insurance policy having a single coverage period equal in length to the full term of the policy. The initial premiums paid by the insured are relatively high compared to premiums paid for standard conditional receipt coverage or comprehensively underwritten policies, but are generally lower than the typical premiums paid for standard simplified issue policies with similar benefit amounts. In exchange for these higher premiums, however, the insurer accepts the application after reviewing the information on the application and completing underwriting of the application on a limited basis, preferably using information available in prescription drug databases, department of motor vehicle databases, databases of medical and non-medical information provided by the Medical Information Bureau, or other suitable databases. The insured has the option of providing an underwriter with medical test results, blood, urine, and/or tissue samples within some contractually defined period of time, for example, at some point in time prior to the expiration of the contestability period of the policy. The test results, blood, urine, and/or tissue samples provided must be sufficient to enable comprehensive medical underwriting. If the insured provides the required medical information and material, then an underwriter comprehensively underwrites the insured after the insurance policy has been issued. If the results of the underwriting are satisfactory, the premiums owed by the insured are reduced significantly for the remainder of the term of the insurance policy and/or the benefit amount is increased. If the insured does not provide the required medical information or material, the premiums remain unchanged, as does the level of coverage provided. If the insured provides required information and medical information but the results of the comprehensive medical underwriting are unsatisfactory, the insured may keep the policy initially purchased, but the premiums remain at the relatively high initial level and the benefit amount remains unchanged.

Selling insurance policies in this way enables the insurer to mitigate its risks but offer the consumer a product with a competitive amount of coverage. The prospective insured is provided coverage for the full coverage period desired at a competitive premium beginning after the application has been underwritten on a limited basis and when the offer of insurance is accepted, without waiting for comprehensive medical underwriting. Further, the insurance company enables the insured to submit information and materials that may be sufficient to reduce the premiums and/or increase the benefit amount at the insured's convenience.

Rather than submitting to a medical examination administered by a qualified physician provided by the insurance company, the prospective insured may alternatively undergo testing performed by any qualified physician, paramedical examiner, or approved laboratory of the insured's choice, including the insured's personal physician. This provides the insured with more convenience and the ability to schedule insurer-required examination coincident with a regularly scheduled physician visit.

Additional features and advantages are described herein, and will be apparent from the following Detailed Description and the figures.

BRIEF DESCRIPTION OF THE DRAWINGS

FIG. 2 is a block diagram indicating two example implementations of the method of selling life insurance.

FIG. 3 is a graph, displaying an example of the value of insurance provided over time for one insured that satisfied the comprehensive underwriting requirements and one that did not submit the required test results, blood, urine, or tissue samples to the underwriter.

DETAILED DESCRIPTION OF EXEMPLARY EMBODIMENTS

Figure 1:
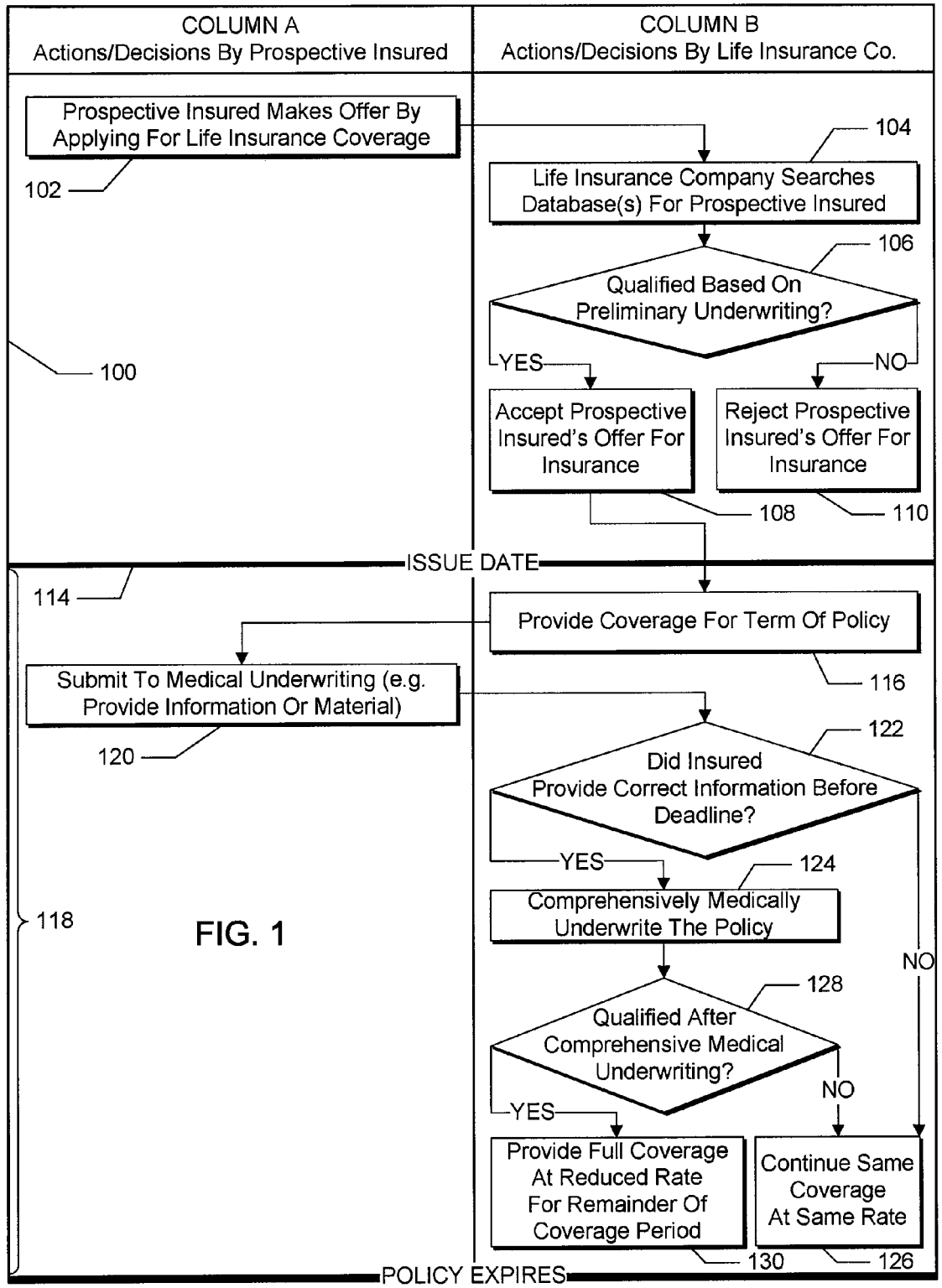
FIG. 1 is a flow chart of an example method of selling life insurance.

FIG. 1 contains a flow chart 100 of an example life insurance policy sales transaction. In FIG. 1, actions taken and decisions made by a prospective insured (purchaser) are included in Column A, and actions taken and decisions made by a life insurance company (seller) are included in Column B. Although the example life insurance sales transaction 100 is described with reference to the flow chart illustrated in FIG. 1, it will be appreciated that many other methods of selling life insurance are contemplated. For example, the order of many of the blocks may be changed, and many of the blocks described are optional.

As illustrated in FIG. 1, the prospective insured makes an offer for a life insurance policy by applying for coverage (block 102). Typically, making this offer includes filling out an application for life insurance, answering questions about the prospective insured's medical history, and paying the first of any premiums due. The life insurance company searches at least one database for information about the prospective insured to underwrite the potential policy on a limited basis (block 104). For example, the insurance company may search a pharmaceutical database containing a listing of all prescription medication taken by the prospective insured, a department of motor vehicles database listing any traffic violations committed by the prospective insured, or a Medical Information Bureau database containing medical health reports about the prospective insured. The insurance company searches these databases to underwrite the eventual insurance policy on a limited basis; the database searches enable the insurer to verify the information provided in the prospective insured's application. Based on the results of the database search, the insurer assesses a number of risk factors such as age, domicile, prescription medication taken, and criminal and driving history, and places the prospective insured in one of a set of predetermined risk classes.

If the limited underwriting qualifies the individual based on a predetermined set of preliminary qualification parameters (block 106), the insurance company accepts the prospective insured's offer for insurance (block 108). The premiums or other consideration required of the prospective insured may be lower than or similar in price to the premiums paid by an insured purchasing a simplified issue insurance policy with a similar benefit. In this example, prior to comprehensive medical underwriting, the premium amounts or other consideration may be higher than the premiums would be for a medically underwritten policy preceded by conditional receipt coverage with an identical benefit amount. If the limited underwriting disqualifies the prospective insured based on the predetermined set of preliminary qualification parameters, the insurance company rejects the prospective insured's offer for insurance and does not provide coverage (block 110).

Referring still to FIG. 1, as soon as the insurance company completes limited underwriting and accepts the prospective insured's offer for insurance, coverage under the policy or agreement begins. The date of acceptance of the prospective insured's application is known as the "issue date" of the insurance policy, represented by line 114. The insurance company continues to provide coverage to the insured for the duration of the term of the policy (the coverage period) 118 (block 116). If, during the coverage period, the insured satisfies all his or her obligations under the policy and an insured event occurs (e.g. the insured dies), the insurance company is contractually bound to pay the benefit to the designated beneficiaries.

Sometime during the coverage period and after the issue date 114, the insured has the option to submit to comprehensive medical underwriting by providing additional information and/or material to the insurer, an underwriter, an approved laboratory, or another entity authorized by the insurer (block 120). The information or material provided enables the insurer, an underwriter, or another entity to comprehensively medically underwrite the policy. For example, the insured may obtain medical testing and may have blood, urine, or other tissue samples taken by a qualified physician of the insured's choice to satisfy the comprehensive medical underwriting requirements. In this example, the insured receives the benefit of scheduling the medical consultation when it is convenient, and with a qualified physician with whom the insured feels comfortable. Alternatively, the insured may submit to a paramedical examination performed by an appropriate paramedical examiner made available by the insurance company or may choose to provide blood, urine, or other tissue samples directly to an approved laboratory. The comprehensive underwriting requirements may mandate that the insured undergo tests, provide blood, urine, and/or other tissue samples, or any combination thereof. In one example embodiment, satisfying the comprehensive underwriting requirement may be done at the insured's own expense. Alternatively, the insurance company may be responsible for some or all of the cost of satisfying such comprehensive underwriting requirements. The insurer itself may not perform the comprehensive underwriting. For example, the insured may be required to submit information, test results, and/or other material sufficient to enable some other party to comprehensively medically underwrite the policy.

The insured may be required to provide any information, test results, and/or material to the appropriate party within a contractually determined time period. For example, the contract may obligate the insured to provide the required information, test results, and/or material to the appropriate party before the end of the period of contestability of the insurance policy or insurance agreement. The contestability period of a given policy or agreement may be two years; the insured may be required to provide any information, test results, or material before the end of this two year period. Alternatively, the insured may be required to provide any test results, information, and/or before a date not corresponding to the end of the contestability. For example, the period of contestability may be two years, but the insured may be required to provide test results, information, and/or other material within six months of the insurance company's acceptance of the insured's offer of insurance.

If the insured provides the correct additional information, test results, and/or other material before expiration of the contractually-indicated time period for compliance (block 122), the life insurance company, an underwriter, or another entity performs a comprehensive medical underwriting of the insurance policy (block 124). This comprehensive underwriting may involve further testing of blood, urine, and/or other tissue samples submitted to the underwriter, verification of the answers to questions in the original application for insurance based on the results of certain medical tests, and/or further classification of risk based on additional information provided by the insured. Moreover, the comprehensive underwriting may be performed cooperatively by a number of different entities. For example, the insurance company, an underwriter, and/or an independent laboratory may perform a portion of the comprehensive underwriting. If a healthy insured submits the information, test results, and/or other material before a certain date (e.g. within six months of the issue date), additional incentives may apply (e.g. premium rebates, further reduced premiums, and/or an increased benefit).

If the information, test results, and/or other materials provided to the insurance company, underwriter, or other entity was not the full required set of information, test results, and/or other materials, or if the information, test results, and/or other materials were not provided to the proper entity before the expiration of the contractually determined time period (block 122), the insurance company continues to provide coverage in the insured's full desired coverage amount but does not reduce the premiums or other consideration required of the insured for the remainder of the policy term (block 126).

If, after comprehensive medical underwriting, the insured is qualified to receive coverage in the insured's full desired coverage amount at a reduced rate (block 128), the insurance company continues to provide coverage in the insured's full desired coverage amount for the duration of the coverage period 118, but reduces the premiums or other consideration due to an amount competitive with the premiums or other consideration typically associated with a conditional issue insurance policy with a similar benefit (block 130). The insurance company may alternatively or additionally increase the benefit provided to the insured such that the occurrence of an insured event results in a greater benefit paid to the designated beneficiary or beneficiaries. If the insured is not qualified after comprehensive medical underwriting is performed (block 128), the insurance company continues to provide coverage, but does not reduce the premium amounts or increase the benefit amount (block 126).

The insured may be allowed to continue paying premiums and may continue to receive coverage even if the insured is unable to satisfy comprehensive medical underwriting—that is, the insured may be given the benefit of his or her bargain. For example, if the results of the comprehensive underwriting are not satisfactory, the insured may continue to pay premiums less than or similar to the premiums or other consideration associated with a simplified issue policy, and the beneficiaries may still be entitled to the benefit of the policy or contract if the insured event occurs. If the insured does not satisfy the conditions with regards to the information, blood, urine, or other tissue submitted for comprehensive medical underwriting, the insured may be given the option of replacing the policy with one requiring reduced premiums and providing a reduced benefit. Alternatively, if the results of the comprehensive medical underwriting are unsatisfactory, the policy may provide for conversion from supplying full life insurance coverage to supplying accidental-death-only coverage. In this embodiment, the beneficiaries may only receive the benefit of the insurance policy or agreement if the insured dies as a result of an accident.

In another example, if the submitted information and material results in unsatisfactory comprehensive medical underwriting, the policy may convert to an Annual Renewable Term (A.R.T.) policy after the level premium period. Such A.R.T. policies may require annually increasing premiums. The insured may pay the annually increasing premium, but may retain the same level of coverage (i.e., the same benefit amount provided for the occurrence of the same insured events) as was provided before the unsatisfactory comprehensive underwriting. The option to treat the policy as an A.R.T. policy may expire when the insured reaches a certain age. For example, the insured may retain the option to pay an annual, increasing renewal fee each year until the insured reaches 95 years of age.

FIG. 2 illustrates two examples of alternative implementations of the method of selling insurance disclosed herein. The prospective insured 200 sends an insurance application 202, which constitutes an offer to purchase insurance, to an insurance sales agent 204 or directly to the life insurance company host device 212 by way of the prospective insured's client device 206. If the prospective insured 200 submits an application for insurance directly to a sales agent 204, sales agent 204 uses the agent's client device 208 to access a network, such as the Internet and/or some other network 210, which enables the agent 204 to send the application to the appropriate the life insurance company host device 212. Similarly, if the prospective insured 200 submits an application for insurance 202 directly to insurance company with the prospective insured's client device 206, the prospective insured's client device 206 sends the application for insurance by way of the Internet and/or some other network 210 directly to the life insurance company host device 212.

As further illustrated by FIG. 2, the life insurance company host device 212 sends a query to a database host 216 and receives a query response 214 over the Internet and/or some other network 210. In different embodiments, the databases searched to perform the limited underwriting include one or more of a pharmaceutical database, a department of motor vehicles database, a database of medical and non-medical information provided by the Medical Information Bureau, and/or some other suitable database. The life insurance company host device 212 receives the query response 214, and based on the query response 214 determines whether to accept the prospective insured's 200 offer for an insurance policy 202.

If the life insurance company host device 212 decides to accept the prospective insured's 200 offer 202, the life insurance company host device 212 may also generate the policy resulting from acceptance of the application. The life insurance company host device 212 then sends the policy either to the prospective insured's 200 client device 206 or to the sales agent's client device 208, depending on how the life insurance company host device 212 received the completed application. If the insurance company host device decides to accept the prospective insured's 200 offer 202, an issue date 114 is established and the insurance company begins to provide coverage. The prospective insured 200 is then provided at least some amount of coverage for the remainder of the coverage period 118.

FIG. 3 illustrates an example of the change in value of insurance coverage that can result from submission of required medical information or material after the issue date 114 but before the end of the coverage period 118. The y-axis 300 of FIG. 3 represents the value of insurance coverage provided, calculated as a coverage level divided by a price. The x-axis 302 represents time beginning at issue date 114. Specifically, the x-axis 302 represents the issue date 114, the coverage period 118, and the underwriting date 310.

As indicated by the legend 304, dashed line 306 represents the value of the insurance if the insured 200 fails to provide any required medical information, test results, and/or material (e.g. blood samples) before the contractually determined compliance date. As noted above, this time period may be within the first six months (or other specified period, usually up to two years) after the issue date of the insurance policy or agreement. Since the insured fails to provide material by the compliance date, dashed line 306 remains constant at a relatively low value even after the underwriting date 310 because failure to submit the required information and/or material means that the insured receives only the benefit of his or her bargain—for example, coverage in the insured's full desired coverage amount at the relatively high initial price.

As further indicated by legend 304, solid line 308 indicates the value of the insurance provided at various time periods during the coverage period 118 if the insured 200 satisfies the comprehensive medical underwriting requirements before the contractually determined compliance date. In this case, all required material is submitted by the compliance date. On the underwriting date 310, an underwriter or other entity comprehensively medically underwrites the policy. Solid line 308 reflects the relative value of insurance coverage provided before and after the underwriting date 310. Segment 308a indicates that an insured 200 receives coverage in the insured's full desired coverage amount but at a relatively low value (due to the high premiums charged) beginning on the issue date 114 and continuing until underwriting date 310. Segment 308b indicates that if the insured 200 submits the required information and/or material by the compliance date and satisfies the comprehensive medical underwriting on underwriting date 310, the value of the insurance increases due to a reduction in premiums and/or an increase in coverage. Segment 308c represents the high value of the insurance after underwriting date 310 due to the continued lower premiums and/or higher coverage.

In one embodiment, the value of insurance represented by dashed line 306 remains substantially constant after underwriting date 310 even if the insured submits the proper test results, information, blood, urine, or other tissue samples and fails the comprehensive medical underwriting. In this embodiment, the insurance company reduces both the level of coverage and also the premiums paid. In one example embodiment, the ratio by which the level of coverage and the premiums are reduced is substantially the same, so the value of insurance received remains constant. In another embodiment, the coverage is reduced proportionately more than the premiums. In one example embodiment, the coverage is reduced by converting the insurance policy to an accidental death only insurance policy. In this embodiment, the overall value of coverage is reduced after comprehensive underwriting (not pictured in FIG. 3). Alternatively, the coverage may be reduced proportionately less than the premiums. Thus, the value of coverage may be slightly increased despite the insured failing to satisfy the comprehensive medical underwriting requirements. In still another example embodiment, if the insured fails the comprehensive medial underwriting, the insurance company may revoke the policy and make a counter-offer of a different level of coverage to the insured based on the failed underwriting.

In summary, persons of ordinary skill in the art will readily appreciate that methods for selling insurance have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention not be limited by this detailed description of examples, but instead by the claims below.

What is claimed is:

1. A method of providing life insurance, the method comprising:
   receiving identification information and underwriting information associated with a person on an application for life insurance covering the person's life;
   causing at least one host device to perform at least one database query based on the underwriting information, said at least one database query producing a query result;
   causing the at least one host device to determine, based on the query result, that the person qualifies for the life insurance;
   providing the life insurance, the life insurance having a first face amount, a first premium amount, and a term;
   providing life insurance coverage at the first face amount for the first premium amount without requiring medical test results associated with the person any time during the term; and
   modifying the life insurance during the term if the medical test results associated with the person are received and are satisfactory, wherein modifying the life insurance includes at least one of increasing the face amount, decreasing the premium amount, and extending the term.

2. The method of claim 1, wherein the life insurance is modified during the term if the medical test results are received from the person within a predetermined time period.

3. The method of claim 1, including supplying an alternate insurance offer if the at least one host device determines that the person does not qualify for the life insurance.

4. The method of claim 1, including fully guaranteeing the life insurance regardless of a medical condition associated with the person that is discovered after the life insurance is provided to the person.

5. The method of claim 4, including raising the premium amount associated with the life insurance on a going forward only basis after determining the medical condition associated with the person.

6. The method of claim 4, wherein fully guaranteeing the life insurance does not include fully guaranteeing the life insurance if the underwriting information includes false information.

7. The method of claim 1, including receiving the medical test results from a doctor selected by the person.

8. The method of claim 1, including receiving the medical test results of a paramedical examination approved by the life insurance provider.

9. The method of claim 1, including receiving the medical test results from an approved laboratory selected by the person.

10. A method of providing life insurance, the method comprising:
    receiving identification information and underwriting information associated with a person on an application for life insurance covering the person's life;

causing at least one host device to perform at least one database query based on the underwriting information, said at least one database query producing a query result;

causing the at least one host device to determine, based on the query result, that the person qualifies for the life insurance;

providing the life insurance, the life insurance having a first face amount, a first premium amount, and a term;

providing life insurance coverage at the first face amount for the first premium amount without requiring medical test results associated with the person any time during the term;

enabling the person to submit to a medical examination, said medical examination resulting in a plurality of medical test results;

if the person submits to the medical examination and the medical test results are satisfactory, modifying the life insurance during the term, said modification including at least one selected from the group consisting of: increasing the face amount, decreasing the premium amount, and extending the term, and if the person submits to the medical examination and the medical test results are unsatisfactory, maintaining the life insurance coverage at the first face amount for the first premium amount during the term.

11. The method of claim 10, wherein the life insurance is modified during the term if the medical test results are received from the person within a predetermined time period.

12. The method of claim 10, including supplying an alternate insurance offer if the at least one host device determines that the person does not qualify for the life insurance.

13. The method of claim 10, wherein a ratio of face amount to premium amount remains constant during the term if the person does not submit to the medical examination or if the person submits to the medical examination and the medical test results are unsatisfactory.

14. The method of claim 10, wherein a ratio of face amount to premium amount increases during the term if the person submits to the medical examination and if the medical test results are satisfactory.

15. A method of providing life insurance, the method comprising:

receiving identification information and underwriting information associated with a person on an application for life insurance covering the person's life;

causing at least one host device to perform at least one database query based on the underwriting information, said at least one database query producing a query result;

causing the at least one host device to determine, based on the query result, that the person qualifies for the life insurance;

providing the life insurance, the life insurance having a first face amount, a first premium amount, and a term;

providing life insurance coverage at the first face amount for the first premium amount without requiring medical test results associated with the person any time during the term;

enabling the person to choose whether to submit to a medical examination during the term, said medical examination resulting in a plurality of medical test results;

if the person chooses to submit to the medical examination during the term and the medical test results are satisfactory, modifying the life insurance during the term, said modification including at least one of increasing the face amount, decreasing the premium amount, and extending the term, and if the person chooses not to submit to the medical examination during the term, maintaining the life insurance coverage at the first face amount for the first premium amount during the term.

16. The method of claim 15, wherein the life insurance is modified during the term if the medical test results are received from the person within a predetermined time period.

17. The method of claim 15, including supplying an alternate insurance offer if the at least one host device determines that the person does not qualify for the life insurance.

18. The method of claim 15, wherein a ratio of face amount to premium amount remains constant during the term if the person does not submit to the medical examination or if the person submits to the medical examination and the medical test results are unsatisfactory.

19. The method of claim 15, wherein a ratio of face amount to premium amount increases during the term if the person submits to the medical examination and if the medical test results are satisfactory.

20. The method of claim 15, including receiving the medical test results of a paramedical examination approved by the life insurance provider.

* * * * *